UNITED STATES PATENT OFFICE.

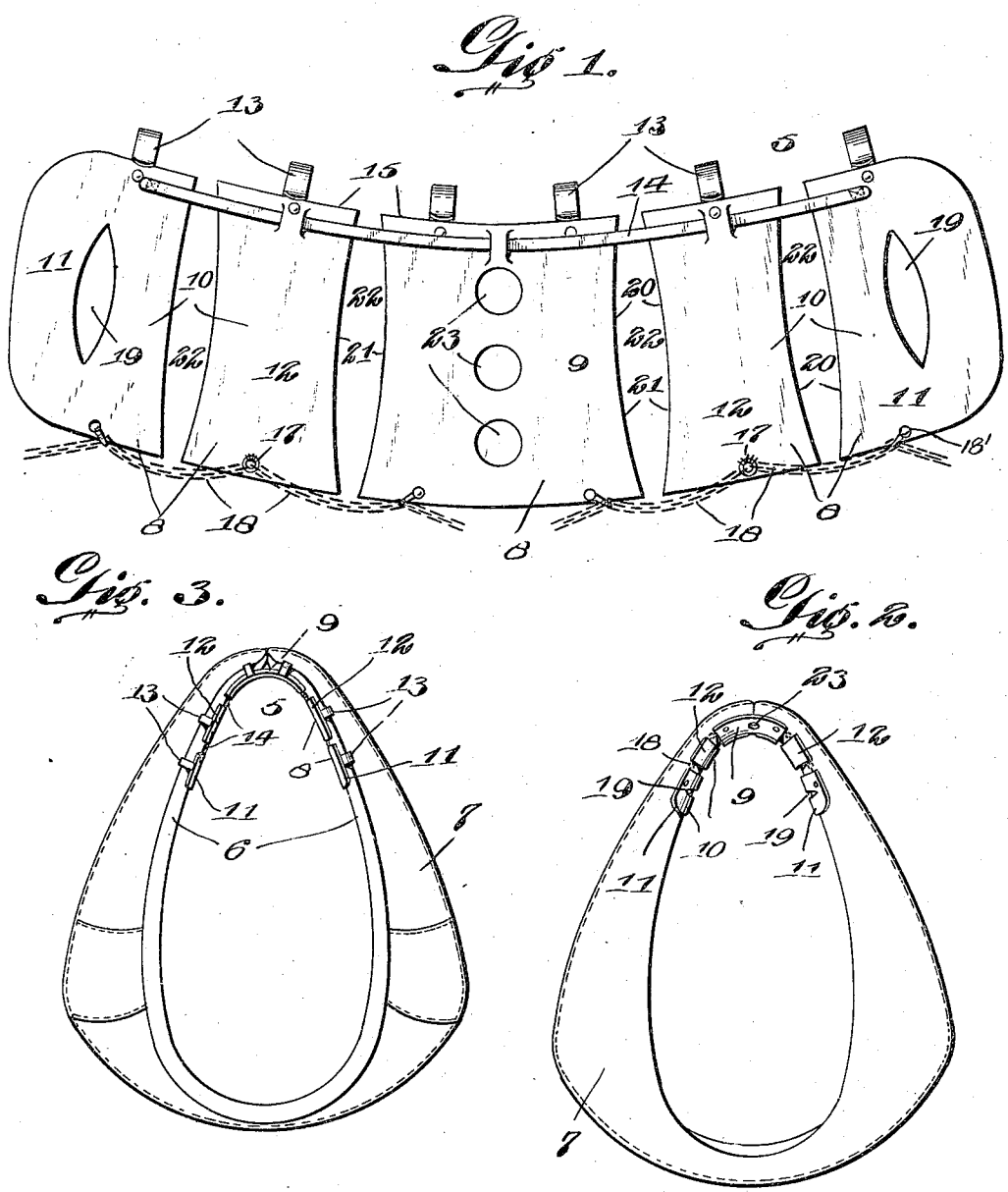

JOHN I. HOWELL, OF SCOTT, ARKANSAS.

NECK-PAD.

1,249,963.  Specification of Letters Patent.  Patented Dec. 11, 1917.

Application filed January 23, 1917. Serial No. 143,975.

*To all whom it may concern:*

Be it known that I, JOHN I. HOWELL, a citizen of the United States, residing at Scott, in the county of Pulaski and State of Arkansas, have invented new and useful Improvements in Neck-Pads, of which the following is a specification.

The present invention relates to a horse collar having removable and adjustable neck pads, and the object thereof is to provide a simple, inexpensive and comfortable horse collar which is adjustable and in which the pads can be easily and quickly inserted and adjusted within the horse collar adapting the pads to horse collars of various sizes.

Another object of the invention is the provision of a neck pad for horse collars constructed from a plurality of sections, and the sections forming the neck pad being so constructed that, when the sections are connected together, it will serve to protect the shoulders of the animal from severe injury when the collar is subjected to undue strains.

A still further object of the invention resides in the provision of a neck pad wherein the sections are each so constructed to permit of a free circulation of air to the animal, which will aid in effecting a speedy healing of the injured or sore portions of the animal's shoulder or neck.

With the above and other objects in view, the invention consists in the novel features, details of construction and combination of parts which will hereinafter be more fully set forth, illustrated in the accompanying drawing and pointed out in the appended claim.

Figure 1 is a plan view of my improved neck pad;

Fig. 2 is a rear elevation of a horse collar illustrating my improved neck pad associated therewith; and Fig. 3 is a front elevation of a horse collar illustrating the pad connected therewith.

Referring more particularly to the accompanying drawing, in which like characters of reference refer to corresponding parts in the several views, the neck pad generally is denoted by the character 5 and is so constructed as to adapt the same in being readily attached to or removed from the usual side sections 6 of the horse collar 7.

I aim to so construct a neck pad for horse collars whereby the working conditions of the animal will not be interfered with, due to the fact that the pad does not contact with the injured or sore portions of the neck or shoulder of the animal when the collar is applied to such animal, thus serving in protecting the shoulders from injury when the collar is subjected to undue strains. To this end, the neck pad 5 is formed from a plurality of sections 8 including a broadened neck engaging section 9 and disposed to opposite sides of such section 9 is a pair of shoulder-engaging sections 10, each pair of shoulder-engaging sections 10 constituting a broad outer end strip 11 and a narrow inner end strip 12. To the front transverse edge of each section of the neck pad is secured a yieldable clamp 13 which fits around one of the sections of the horse collar for detachably connecting the pad thereto. Each of the sections 8, constituting the neck pad, is connected to another through the medium of a flexible connecting member 14, connected with the front longitudinal edge 15 of each of said sections. This connecting member 14 is preferably threaded through each of the sections, permitting of a sliding adjustment of each of the sections upon the flexible connecting member, for a purpose which will hereinafter be fully set forth. Secured along the rear longitudinal edge 16 of each of said sections are loops 17, to which are adjustably connected chains 18. The chains 18 permit of the adjustment of the neck and shoulder sections of the pad on the flexible connecting member 14, thus affording means for sliding the sections to one side of the injured or sore portions of the animal's shoulder. The adjustability of the chains 18 is accomplished by the engagement in the links thereof of a retaining member which may be in the form of a snap hook or the like and indicated by the character 18'.

With reference more particularly to Fig. 1 of the drawing, it will be seen that the outermost end strips 11 of the shoulder sections are cut out to provide a transversely arranged substantially elliptical opening 19, thus in adjusting the sections, this opening 19 is placed around the injured or sore portions of the animal's shoulder, relieving the contact of the pad sections therewith. The confronting transverse edges 20 of each of the neck pad sections are concaved as at 21, whereby when the pad sections are in assembled position, provision is made between each of the sections for a substantially elliptical opening 22. This formation of the confronting transverse edges of the sections, resulting in substantially elliptical openings 22 therebetween, provides efficient means for permitting of ventilation to the animal when the collar 7 is in applied position. The neck engaging section 9 of the neck pad is further provided with a central row of openings 23, further serving to allow of the admission and circulation of air to the neck of the animal.

From the foregoing description, taken in connection with the accompanying drawing, the advantages of the construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claim appended thereto.

I claim:

A pad for horse collars embodying a plurality of sections each having its section-confronting edge concaved, means for connecting said sections together, and chains for adjustably connecting the sections together, the arrangement being such that the confronting edges of the sections define between the sections when in assembled position ventilating openings.

In testimony whereof I affix my signature.

JNO. I. HOWELL.

Copies of this patent may be obtained for five cents each, by addressing the "Commissioner of Patents, Washington, D. C."